(12) United States Patent
Lawrence

(10) Patent No.: US 11,454,486 B2
(45) Date of Patent: Sep. 27, 2022

(54) MEASUREMENT DEVICE AND KIT AND METHODS OF MAKING AND USING THE SAME

(71) Applicant: Honda Motor Co., Ltd., Tokyo (JP)

(72) Inventor: Claude Lawrence, Marysville, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 535 days.

(21) Appl. No.: 16/553,913

(22) Filed: Aug. 28, 2019

(65) Prior Publication Data

US 2021/0063132 A1 Mar. 4, 2021

(51) Int. Cl.
*G01B 5/10* (2006.01)
*G01M 17/013* (2006.01)
*G01B 5/30* (2006.01)
*G01B 5/20* (2006.01)

(52) U.S. Cl.
CPC .............. *G01B 5/10* (2013.01); *G01B 5/201* (2013.01); *G01B 5/30* (2013.01); *G01M 17/013* (2013.01)

(58) Field of Classification Search
USPC ............. 33/203, 1 BB, 203.12, 203.18, 550
See application file for complete search history.

(56) References Cited

U.S. PATENT DOCUMENTS

| 3,690,010 | A | * | 9/1972 | Kiedrowski | ............. | G01B 5/00 33/555 |
| 5,033,003 | A | * | 7/1991 | Lees, Sr. | ............. | G01M 17/021 73/146 |
| 6,324,908 | B1 | | 12/2001 | Colarelli, III et al. | | |
| 6,408,528 | B1 | * | 6/2002 | Diez | ........................ | G01M 1/02 33/600 |
| 6,735,878 | B2 | | 5/2004 | Lie | | |
| 6,810,593 | B2 | * | 11/2004 | Kobayashi | ............. | G01B 5/201 73/146 |
| 7,290,348 | B2 | * | 11/2007 | Katamachi | ............. | G01B 5/201 33/573 |
| 8,196,637 | B1 | * | 6/2012 | Story | .................. | B60C 25/0545 157/1.1 |
| 9,581,424 | B2 | * | 2/2017 | Takanashi | ............. | G01B 5/201 |
| 10,514,244 | B2 | * | 12/2019 | Nakayama | ............. | G01B 5/201 |
| 2003/0038724 | A1 | * | 2/2003 | Leja | ........................ | A01B 23/06 340/679 |
| 2004/0216294 | A1 | | 11/2004 | Merrifield | | |

(Continued)

FOREIGN PATENT DOCUMENTS

CN 201795770 U 4/2011
CN 104315953 A 1/2015

(Continued)

*Primary Examiner* — Christopher W Fulton
(74) *Attorney, Agent, or Firm* — Kenealy Vaidya LLP

(57) ABSTRACT

A measurement device can include a plurality of wheel support modules. Each of the wheel support modules can be configured to attach to a different type of vehicle wheel and to provide for rotation of the vehicle wheel about an axis. An arm can be removably attached to the first wheel support module. A measurement element that measures deformation of the vehicle wheel can be moveably attached to the arm. The different configuration of each of the wheel support modules allows for various types of vehicle wheels to be measured for deformation using the same measurement device.

18 Claims, 7 Drawing Sheets

(56) References Cited

U.S. PATENT DOCUMENTS

2008/0123107 A1* 5/2008 Sotgiu ................ B60C 25/0554
　　　　　　　　　　　　　　　　　　　　　157/1.1
2021/0131784 A1* 5/2021 Baldwin ................ G01B 5/201

FOREIGN PATENT DOCUMENTS

| CN | 204177311 U | | 2/2015 | |
|---|---|---|---|---|
| CN | 104913703 A | | 9/2015 | |
| CN | 204757856 U | | 11/2015 | |
| CN | 107314727 A | * | 11/2017 | |
| CN | 207066277 U | | 3/2018 | |
| CN | 106247908 B | * | 7/2019 | ............ G01B 5/245 |
| CN | 112229298 A | * | 1/2021 | ............... G01B 5/00 |
| KR | 101837298 B1 | * | 4/2018 | |

* cited by examiner

MEASUREMENT DEVICE AND KIT AND METHODS OF MAKING AND USING THE SAME

BACKGROUND

The disclosed subject matter relates to a measurement device, related kit, and methods of making and using a measurement device to measure variance in diameter of a wheel.

Vehicles can have various types and numbers of wheels that are rotatably attached to the vehicle for facilitating movement of the vehicle over a surface, such as a paved road or uneven terrain. Each of the wheels can include a central hub connection portion configured for attachment to a suspension component, such as a hub, via a knuckle, or hub assembly, of the vehicle. The wheel can include spokes or other connective structure that connect the central hub connection portion to an outer rim of the wheel. The hub connection portion can include bolt holes that are positioned in a bolt pattern. The bolt holes are configured to house bolts or studs that extend from a hub or other mounting structure of the suspension of the vehicle.

The outer rim of the wheel can support a tire and can include a lip on each of the inner and outer peripheral surfaces to retain the tire therein. The wheels can be driven or powered by a powertrain of the vehicle that can include an internal combustion engine, one or more electric motors, or a hybrid of an internal combustion engine and one or more electric motors, or other known engine/motor.

As a vehicle wheel travels over a surface, the wheel can be exposed to a variety of forces. For example, when the vehicle is traveling over terrain, a wheel can be exposed to rocks, cracks, abutments or other features of the terrain. Likewise, when the vehicle is traveling over a roadway surface, the wheel can be exposed to potholes, curbs, and other features. Thus, while traveling over various surfaces, the wheel may be exposed to sufficient impact so as to bend or deform the rim of the wheel.

Various measurement devices, systems and methods have been used to measure the amount of deformation that has occurred in a wheel after either a known or unknown force has been applied to the wheel. These devices, systems and methods are utilized for various purposes, including ensuring a supplied wheel complies with certain specifications, or to determine whether repair may be necessary after deformation of a wheel in operation, as well as for routine quality inspection. There exists a need for a modular measuring system and method that can be used with various types of wheels and that accurately measures a vehicle wheel for specification compliance, quality control, and for various deformations due to manufacturing issues and/or exposure to routine or non-routine forces to the wheel (either in a testing scenario or in the field). There is also a need to improve accuracy, repeatability, and speed of automotive wheel impact deformation measurement.

The device, kit and method disclosed can be used after running lab tests that confirm the performance of the wheel in a more controlled environment (as compared to when driving over bumps or into potholes). For example, in one test, a large weight is dropped onto the rim flange (wheel and tire only) from a specific height for repeatability. Afterward, the device disclosed herein can be used to measure an amount of deformation caused by the weight's impact on the rim flange or lip.

SUMMARY

Some embodiments directed to a measurement device can include a vehicle wheel deformation measurement device that includes a first wheel support module configured to attach to a vehicle wheel and to provide for rotation of the vehicle wheel about an axis. An arm can be removably attached to the first wheel support module. A measurement element can be moveably attached to the arm, and the measurement element can include a sensor structure configured to be positioned adjacent a lip of the vehicle wheel when attached to the first wheel support module to measure deformation of the vehicle wheel.

According to another embodiment of the disclosed subject matter, a vehicle wheel deformation measurement device can include a first wheel mount module including attachment structure configured to removably attach to a vehicle wheel. A positioning bracket can be removably attached to the first wheel mount module. A measurement element can be attached to the positioning bracket. The positioning bracket can be configured to position the measurement element adjacent the vehicle wheel when the vehicle wheel is attached to the first wheel mount module in order to measure deformation of the vehicle wheel when the vehicle wheel is rotated.

According to yet another embodiment of the disclosed subject matter, a wheel deformation measurement kit, can include a first wheel support module configured to attach to a first vehicle wheel and to provide for rotation of the first vehicle wheel about an axis. The kit can also include a second wheel support module configured to attach to a second vehicle wheel and to provide for rotation of the second vehicle wheel. A measurement element can be provided in the kit and configured to measure deformation of at least one of the first vehicle wheel and the second vehicle wheel. A positioning bracket can also included and have a wheel support module attachment structure at a first portion and a measurement element attachment structure at a second portion, such that the first wheel support module and the second wheel support module are removably attachable to the wheel support module attachment structure.

BRIEF DESCRIPTION OF THE DRAWINGS

The disclosed subject matter of the present application will now be described in more detail with reference to exemplary embodiments of the apparatus and method, given by way of example, and with reference to the accompanying drawings, in which.

DETAILED DESCRIPTION OF EXEMPLARY EMBODIMENTS

A few inventive aspects of the disclosed embodiments are explained in detail below with reference to the various figures. Exemplary embodiments are described to illustrate the disclosed subject matter, not to limit its scope, which is defined by the claims. Those of ordinary skill in the art will recognize a number of equivalent variations of the various features provided in the description that follows.

The disclosure provides a measurement device, system, and kit that can measure deformation in the rim of a wheel. The disclosure also provides related methods of making and using such a measurement device.

Figure 1:
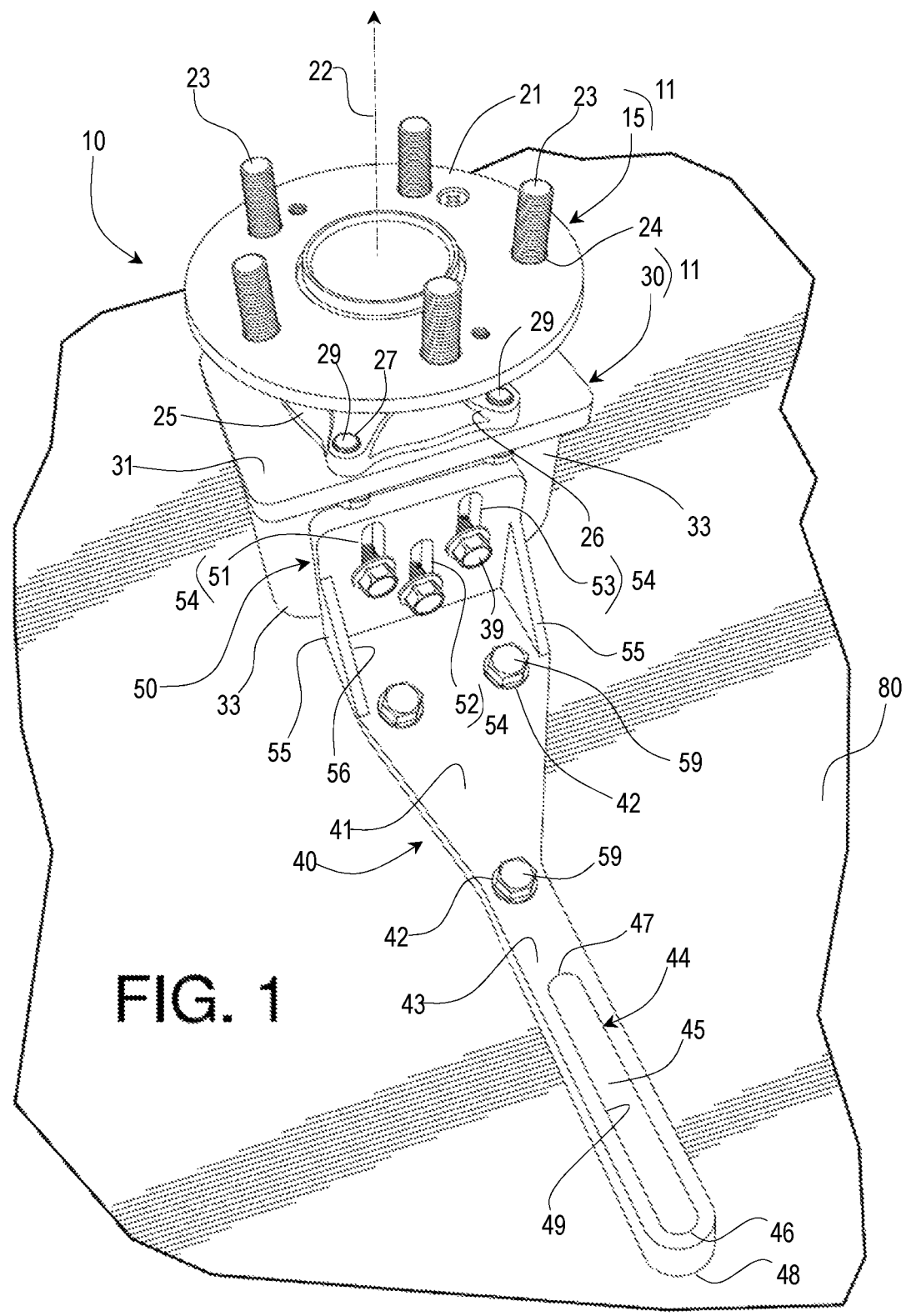
FIG. 1 is a perspective view of a measurement device made in accordance with principles of the disclosed subject matter.
Figure 5:
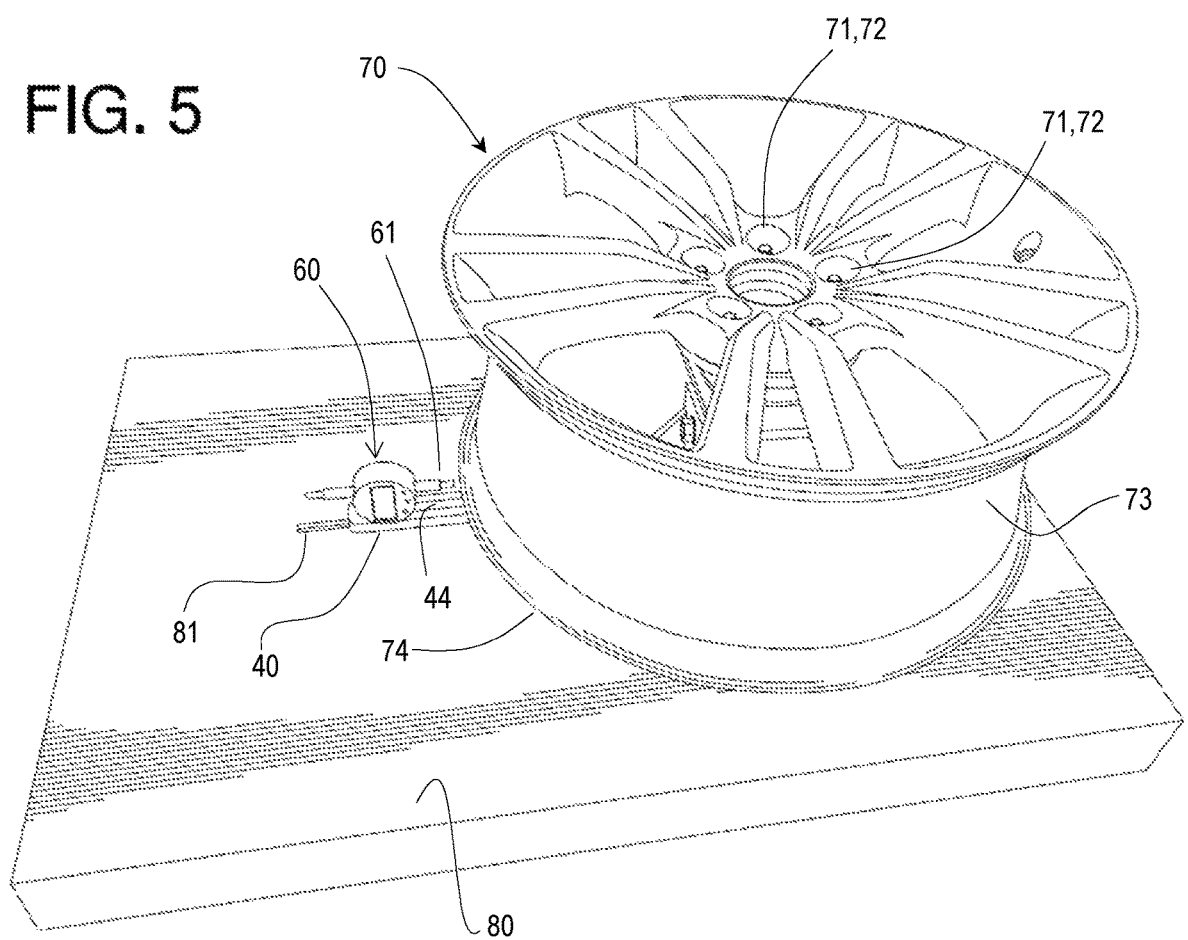
FIG. 5 is a perspective view of a further embodiment of a measurement device in operation with a vehicle wheel in accordance with principles of the disclosed subject matter.

FIG. 1 is a perspective view of a measurement device 10 made in accordance with principles of the disclosed subject matter. FIG. 5 is a perspective view of an embodiment of a measurement device in operation with a vehicle wheel 70. The measurement device 10 is configured to measure deformation around a rim 73 of the vehicle wheel 70.

The measurement device 10 can include a hub and bearing mount 15, which can also be referred to as a hub and bearing assembly. The hub and bearing mount 15 can couple to a positioning bracket such as an arm 40. The arm 40 can extend radially away from a center point or rotational axis 22 of the hub. A measurement element 60 can be positioned along an extent of the arm 40 or at an end of the arm 40. The measurement element 60 can be various types of measuring devices that measures linear position with respect to a rotating lip, including a dial gauge, light sensing gauge, etc. The measurement element 60 can include a measuring tip or tip portion 61 that points inward toward the axis 22 of the hub 21 (and wheel 70 when attached).

The hub and bearing mount 15 can be interchangeable with other hub and bearing mounts, of different sizes, shapes, and configuration, so to accommodate wheels having different sizes and/or geometries. The arm 40 can be adjustably coupled to the hub and bearing mount 15. More specifically, the arm 40 can be adjustably coupled to a center portion or module adapter 30 of the measurement device 10. The arrangement can allow adjustment of the hub and bearing mount 15 in a vertical direction, as described below. In addition, a measurement element or dial gauge 60 can be adjustably coupled to the arm 40 to allow adjustment in a radial direction, i.e. inwardly and outwardly with respect to the hub and bearing mount 15 (and with respect to wheel 70 when attached). The measurement element 60 can include a contact structure configured to be positioned a predetermined distance from the lip 74 of the rim 73 of the vehicle wheel 70 when the wheel 70 is attached to the hub and bearing mount 15. The contact structure can measure deformation of the vehicle wheel 70.

The measurement device 10 can include a wheel support module 11. The wheel support module 11 can be configured to attach to a vehicle wheel 70 and to provide for rotation of the wheel about the axis 22, which can be referred to as a center axis 22. The wheel support module 11 can be removably attached to the arm 40.

The wheel support module 11 can include the hub and bearing mount 15 and the module adapter 30. The hub and bearing mount 15 can be attached to the module adapter 30 by various attachment structures, such as bolt fasteners 29. Thus, the measurement device 10 can provide various interchangeability or modularity so as to accommodate wheels of different sizes and wheels of different bolt patterns 72, for example.

The module adapter 30 can be removably and adjustably attached to the arm 40. Such attachment can be provided by at least one fastener 39. Such arrangement can provide or allow interchangeability of the wheel support module 11. The hub and bearing mount 15 can be removably attached, by at least one second fastener 29, to the module adapter 30. Such structure can allow interchangeability of the hub and bearing mount 15. Accordingly, in some uses and embodiments of the disclosure, differently shaped wheel support modules 11 can be provided and interchanged so as to accommodate different wheels. In some uses and embodiments of the disclosure, differently shaped hub and bearing mounts 15 can be provided ad interchanged so as to accommodate different wheels, while keeping the same module adapter 30.

In at least some embodiments of the disclosure, the hub and bearing mount 15 and the module adapter 30 can be integrally formed, collectively forming a wheel support module 11. With such arrangement, the wheel support module 11 can be removably attached to the arm 40 by at least one fastener 39.

The fasteners 29 and 39 can be a bolt, rivet, screw, weld, or other attachment structure. The fasteners 29, 39 can be partially or totally threaded and can be used with or include a threaded nut.

The hub and bearing mount 15 can include a hub 21 and a base 25. The hub 21 can include a disc and a plurality of studs 23. The hub 21 can be rotatably supported on the base 25 using any suitable bearing or rotational mechanism, such as a roller bearing arrangement, ball bearing arrangement, needle bearing, or any other bearing arrangement or mechanism. The studs 23 can be threadably received into threaded apertures 24 in the disk of the hub 21. Alternatively, the studs 23 can be integral with the disc of the hub 21 or can be received into threaded apertures in an element that is attached to the disc, such as a nut that is welded underneath the disc of the hub 21. The studs 23 can also be friction fit into holes 24 in the hub 21.

The studs 23 can vary in number and geometry so as to match with a bolt pattern 72, of a particular wheel. In the situation that the studs 23 do not match up with the bolt pattern 72 of the particular wheel, then the hub and bearing mount 15 can be switched out for another hub and bearing mount 15. In performing such switching, a first hub and bearing mount 15 (See FIG. 7) can be detached from the module adapter 30 and another hub and bearing mount 115 (see FIG. 8) can be placed on the same module adapter 30. In other implementations or uses of the measurement device 10, the module adapter 30 can also be included with the hub and bearing mounts 15, 115 and switched out for another module adapter 30. For example, it may be desired to use a different module adapter 30 that possesses a different height or other geometry. Accordingly, a first hub and bearing mount 15 can be switched out for a new hub and bearing mount 115 that matches up with the particular wheel, in conjunction with using a different module adapter 30 of desired height or other geometry.

The base 25 can be attached onto a top surface of the module adapter 30. Base fasteners 29 can be used to provide the attachment of the base 25 onto the module adapter 30. The base 25 can include ridges 26 or other structure so as to provide structural integrity to the base 25. The ridges 26 can also house respective holes 27 in the base 25. The holes 27 can house or be connected via threads to the fasteners 29. The base 25 can be of sufficient width, thickness, and geometrical configuration so as to effectively support the hub and bearing mount 15 when a wheel is attached thereon.

Figure 3:
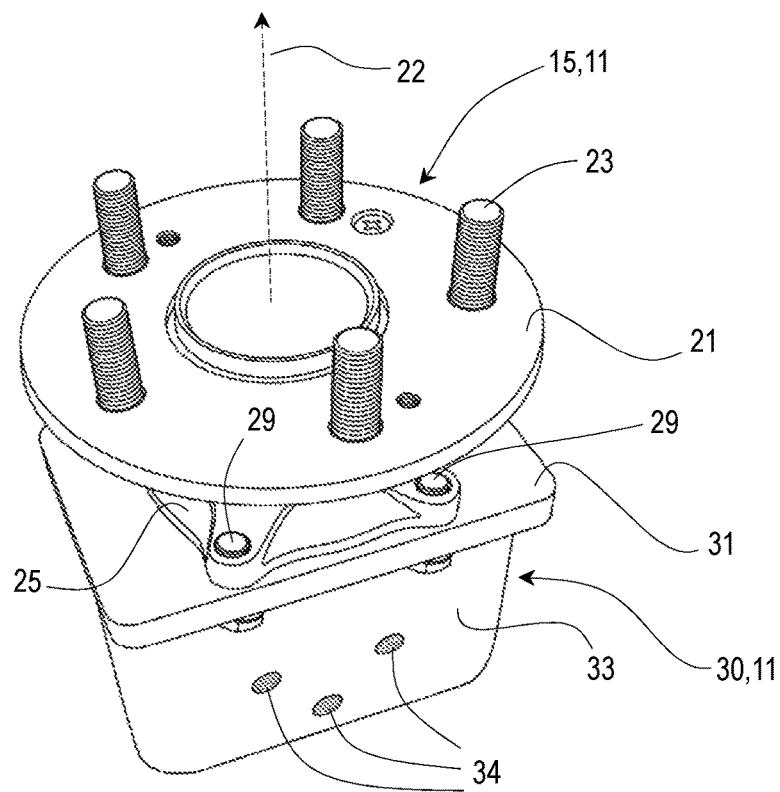
FIG. 3 is a perspective view of the hub and bearing mount with a module adaptor of FIG. 1.
Figure 4:
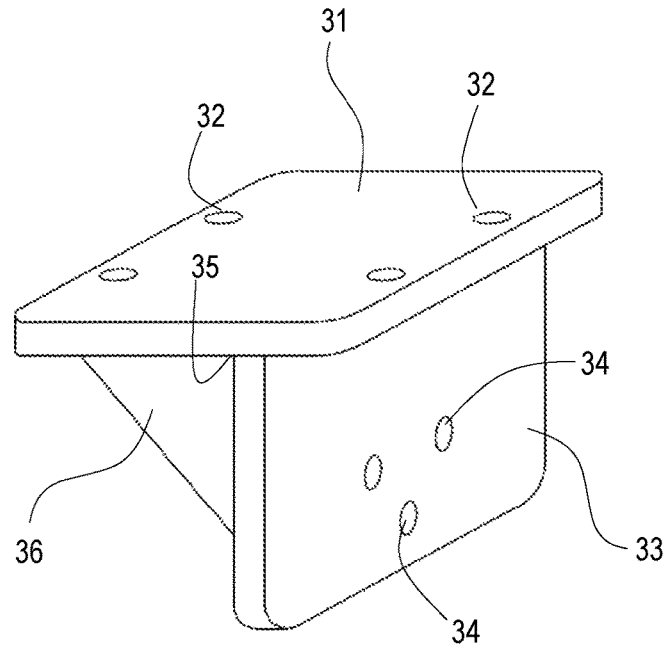
FIG. 4 is a perspective view the module adaptor of FIG. 3.

An exemplary module adapter 30 is shown in FIGS. 1, 3 and 4 and can include a first mount plate 31 and a second mount plate 33. The first mount plate 31 can include a horizontal plate. The second mount plate 33 can include a vertically disposed plate. The first mount plate 31 can be attached to the second mount plate 33 along a connection seam 35. The first mount plate 31 can be welded or otherwise bonded to the second mount plate 33. The first mount plate 31 can also be integrally formed with the second mount plate 33. As shown in FIG. 4, for example, the first mount plate 31 can be disposed horizontally and at right angles to the second mount plate 33. The module adapter 30 can also include one or more reinforcing flanges or pieces 36. The reinforcing flange 36 can span one or more corners that are provided between the first mount plate 31 and the second mount plate 33. The reinforcing flange 36 can be welded or otherwise bonded, clamped, or attached to each of the first mount plate 31 and the second mount plate 33.

The first mount plate 31 can include apertures or holes 32. The apertures 32 can accommodate the fasteners 29 so as to attach the modular adapter 30 to the base 25. The particular spacing and pattern of the apertures 32 can be varied as desired so as to provide sufficient structural integrity.

The second mount plate 33 can include apertures or holes 34. The apertures 34 can accommodate the fasteners 39 that serve to attach the module adapter 30 onto a positioning bracket formed in this example as an arm 40. The fasteners 39 can also be referred to as bracket fasteners. The particular spacing and pattern of the apertures 34 can be varied as desired so as to provide sufficient structural integrity to the module adapter 30.

Figure 2:
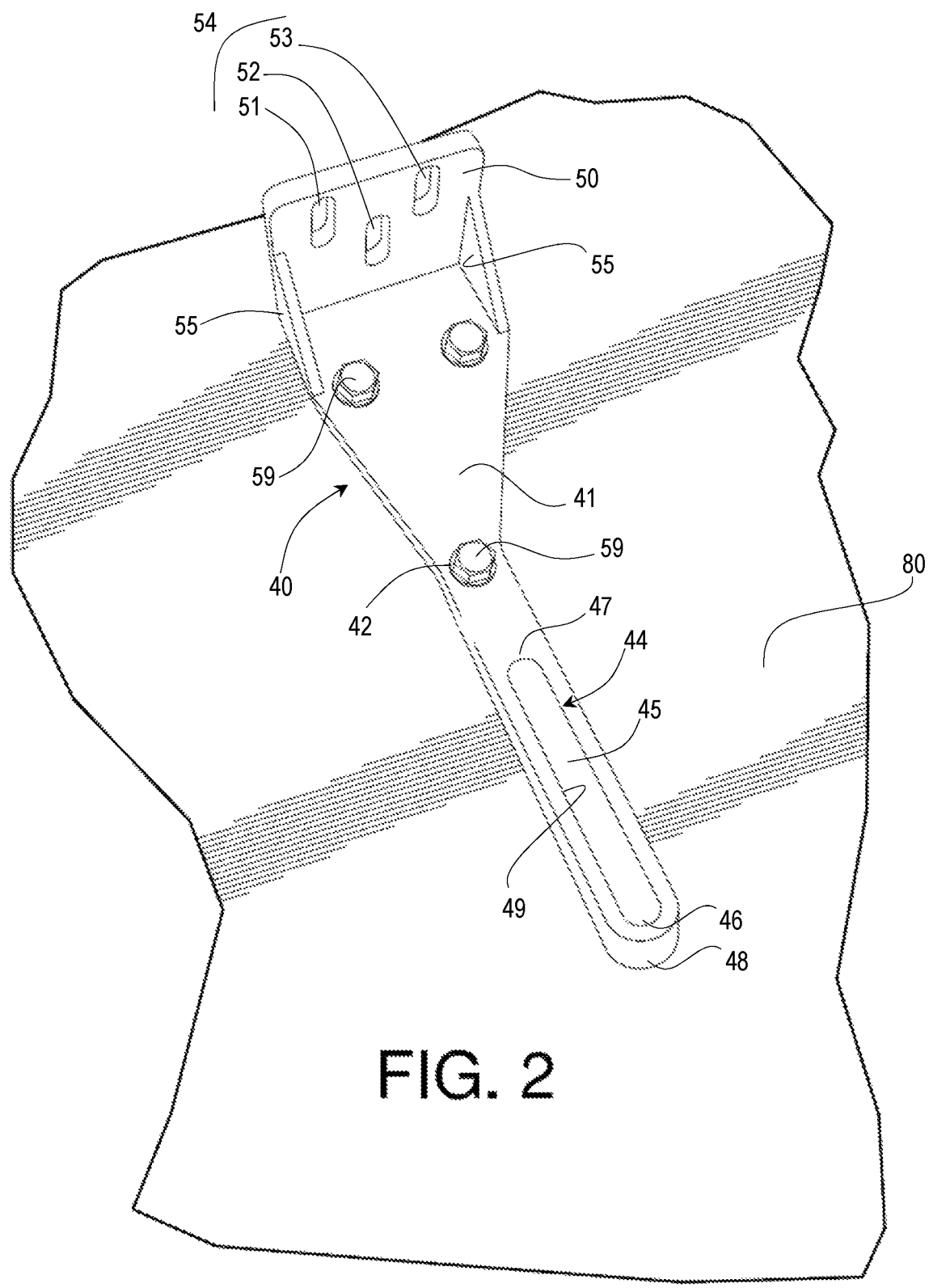
FIG. 2 is a perspective view of an arm of the measurement device of FIG. 1.

As shown in FIGS. 1 and 2, the arm 40 can attach to and support the module adapter 30. More specifically, the arm 40 can removably and adjustably support the module adapter 30.

The arm 40 can include an attachment plate 41, an extension portion 43, and an attachment flange 50. As shown in FIG. 1, the attachment plate 41 can be triangular or flared in geometry. The attachment plate 41 can include a plurality of apertures 42. The apertures 42, in the attachment plate 41, can accommodate a plurality of fasteners 59. The fasteners 59 can serve to connect the arm 40 to a support element 80, as shown in FIGS. 1 and 2. The support element 80 can be a bench or table constructed of metal or wood, for example. The support element 80 can also be a surface or a platform such as a floor surface of the particular facility. The support element 80 can include threaded inserts that are embedded into the support element 80. Such threaded inserts, in the support element 80, can accommodate the fasteners 59 and provide for removal of the entirety of the measurement device 10 from the support element 80.

The extension portion 43 of arm 40 can extend outwardly from the attachment plate 41. The extension portion 43 can be uniform in width and height along a length of the extension portion 43. The extension portion 43 can extend from the attachment plate 41 out to an end 48 of the extension portion 43.

The extension portion 43 can include a securement slot 44 having a slot cavity 45. The securement slot 44 can include an outer end 46 and an inner end 47. The measurement element 60 can be adjustably attached to the securement slot 44. Accordingly, the measurement element 60 can be selectively positioned between the inner end 47 and the outer end 46. This adjustable coupling of the measurement element 60 to the arm 40 provides adjustment in a radial direction, i.e., inwardly and outwardly from center axis 22 (and from the wheel 70 when the wheel 70 is attached to the measurement device 10). The measurement element 60 can be adjustably coupled to the securement slot 44 using any suitable arrangement or mechanism. For example, the measurement element 60 can include an enlarged lower portion or end that is received into the slot cavity 45. At an inner portion thereof, the slot cavity 45 may possess width that is greater than an opening 49 of the securement slot 44. As a result, the enlarged lower portion (of the measurement element 60) can be secured within the securement slot 44. With the enlarged lower portion of the measurement element 60 secured within the securement slot 44, a clamping force can be applied so as to secure the measurement element 60 in position, i.e., so that the measurement element 60 does not unintentionally slide along the securement slot 44. For example, a nut (disposed on a threaded stud of the measurement element 60) might constitute the enlarged lower portion of the measurement element 60, with the threaded stud received into the nut. As the threaded stud/measurement element 60 is rotated, and further received into the nut, the measurement element 60 can be "tightened" onto the securement slot 44. Accordingly, the measurement element 60 can be easily positioned along a length of the securement slot 44.

The arm 40 also includes the attachment flange 50, as shown in FIG. 2. The attachment flange 50 can extend upwardly from the attachment plate 41. In the depicted embodiment, the attachment flange 50 extends upwardly from the attachment plate 41 at a right or 90° angle.

The attachment flange 50 can include at least one slot 51, 52, 53, as shown in FIG. 2. A respective fastener 39 can extend through each of the at least one slot 51, 52, 53. As described above, each of the fasteners 39 can be received into or accommodated by an aperture 34 in the module adapter 30. Each of the fasteners 39 can be in the form of a bolt, for example.

The slots 51, 52, 53 may be referred to as a first slot 51, a second slot 52, and a third slot 53 all constituting a slot set 54. In implementation, the fasteners 39 can be tightened down so as to secure the module adapter 30/hub and bearing mount 15 onto the attachment flange 50. In other words, the wheel support module 11 can be secured onto the attachment flange 50 of the arm 40. In the arrangement shown in FIG. 1, the hub and bearing mount 15 is positioned at a lowest setting since the fasteners 39 are bottomed-out in the slots 51, 52, 53. The arrangement shown in FIG. 1 may be provided for a particular width wheel. In the case that a wheel of larger width needs to be measured, prior to mounting of the larger wheel onto the studs 23, the fasteners 39 can be loosened. Once the fasteners 39 are loosened, the modular adapter 30 with hub and bearing mount 15 can be raised up to a desired height. Additionally, in this example, the studs 23 of the particular hub and bearing mount 15 may not match with the bolt pattern 72 of the wheel to be measured. In such a situation, the hub and bearing mount 15 can also be switched out for a hub and bearing mount 15 with studs 23 that do match with the particular pattern 72. For example, with one interchangeable option, the fasteners 29 can be loosened so as to disconnect a first hub and bearing mount 15 and reconnect a second hub and bearing mount 15. The second hub and bearing mount 15 can possess studs 23 with the desired bolt pattern 72. Of course, switching out can also be accomplished by detaching bolts 39 from the module adaptor 30 and replacing all of the module adaptor 30 and hub and bearing mount 15 with a different module adaptor 30 and hub and bearing mount 15.

It should be appreciated that the length or height of each slot in the slot set 54 can be varied in manufacture as may be desired. Accordingly, such vertical adjustability, in conjunction with the radial adjustability provided by the securement slot 44, affords a measurement device 10 that can accommodate a variety of wheels of the various width and diameter. Further, as shown in FIG. 1, the slots 51, 52, 53 can be staggered in height. Such arrangement may provide ease in accessing the fasteners 39 with a wrench, for example.

FIG. 5 is a perspective view a further embodiment of a measurement device 10 in operation with a vehicle wheel 70. The vehicle wheel 70 is mounted onto the hub and bearing mount 15. The arm 40 can be seen extending out from the center axis 22 beyond a diameter of the rim 73. The rim 73 can include lip 74. In operation, the measurement element 60 can be loosened from the securement slot 44 in a manner as described above. The measurement element 60 can then be slid along the length of the securement slot 44 to a desired position. Such desired position can be achieved by positioning a measuring tip 61 (of the measurement element 60) a desired distance from (or in contact with) the lip 74 of the wheel 70. The wheel 70 can then be rotated by hand or by any suitable mechanical arrangement. As the wheel is rotated, interrelationship of the measurement element 60 relative to the rim 73/lip 74 can vary. The amount of variance can depend on the deformity of the wheel. Accordingly, by observing such varying interrelationship between the rim 73/lip 74 and the measurement element 60, assessments can be performed regarding the deformation condition of the wheel 70.

With the arrangement shown in FIG. 5, a support slot 81 can be formed in the support element 80. The support slot 81 can extend through or into the support element 80 and provide adjustability of the measurement element 60 along the length of the support slot 81. Accordingly, the support slot 81 can provide yet further adjustability. In at least some embodiments, a threaded fastener can be attached at a top end to the measurement element 60. The threaded fastener can extend from the measurement element 60 down through the arm 40 and also through or into the support element 80. A threaded nut can be provided at a lower end of such threaded fastener so as to be accessed by reaching under the support element 80. The threaded nut can then be tightened so as to secure the measurement device 60 onto the support element 80. It should be appreciated that other attachment arrangements or mechanisms may be used so as to attach the measurement element 60 to a support surface or to a support structure.

Figure 6:
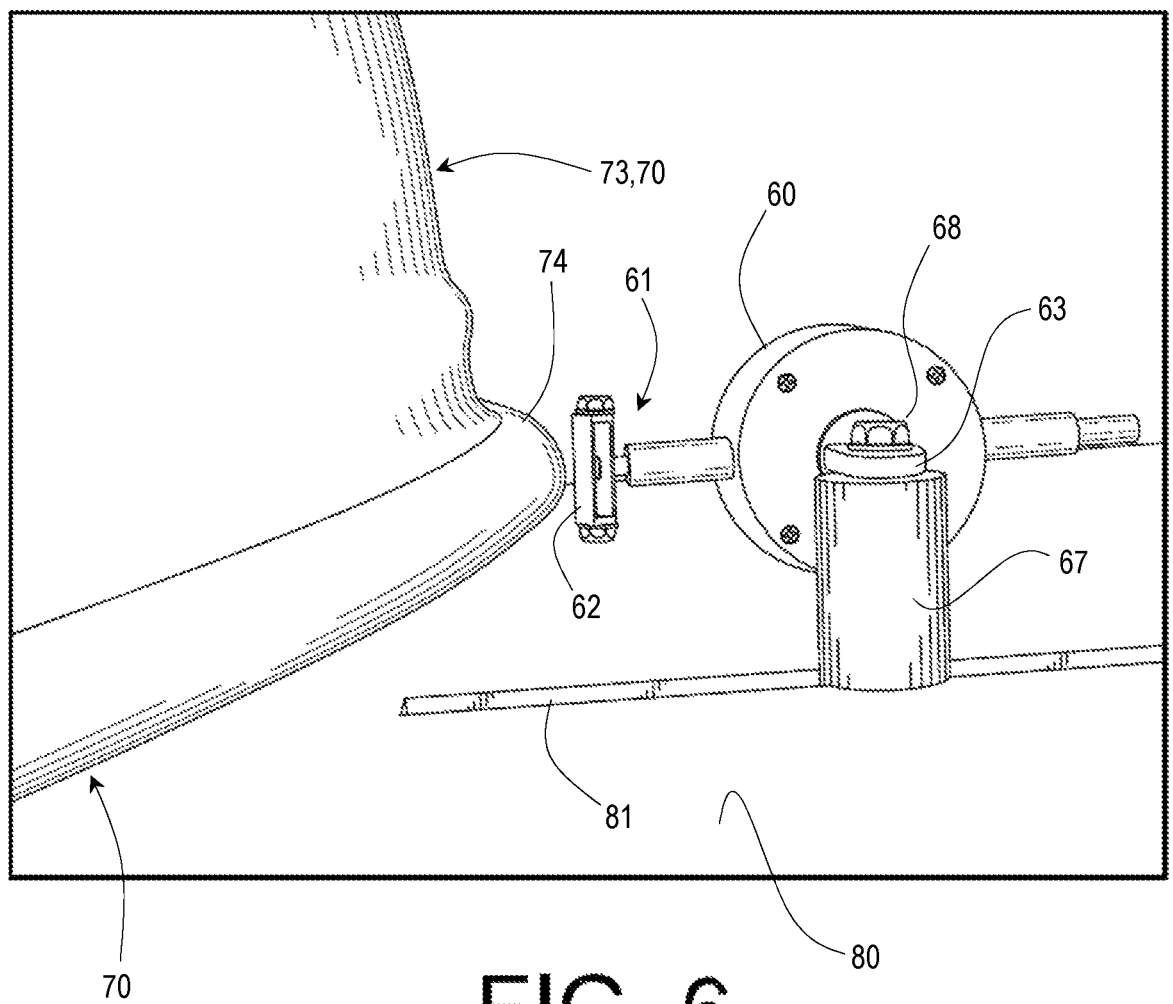
FIG. 6 is a perspective view of a further embodiment of a measurement device in operation with a vehicle wheel in accordance with principles of the disclosed subject matter.

FIG. 6 is a perspective view a further embodiment of a measurement device in operation with a vehicle wheel. In the arrangement of FIG. 6, the measurement element 60 with measuring tip 61 can be connected directly to the support element 80. With such an arrangement, the measurement element 60 can include or be attached to a support tab 63 with an aperture. In the arrangement illustrated in FIG. 6, the extension portion 43 can be omitted (with reference to the arrangement shown in FIG. 1). The arrangement shown in FIG. 6, with extension portion 43 omitted, can include the attachment plate 41, which can be secured to the support element 80. The support element 80 and/or arm 40 alone or in conjunction with each other can be considered a positioning bracket.

The arrangement of FIG. 6 can include a support post 67 with a fastener 68. The support post 67 can include a hole or aperture extending vertically through the support post 67. The fastener 68 can extend through the aperture of the support tab 63, through the length of the support post 67, through or into the support element 80. With such arrangement, the support element 80 may be understood to be a support platform. The fastener 68 can be tightened down by threading a nut or threaded insert on a lower extent of the fastener 68. Accordingly, by tightening down on the fastener 68, as secured by a nut or threads located in or underneath the support platform 80, the support post 67 and support tab 63 can be secured. As a result, the measurement element 60 (that is attached to the support post 67 and/or a support tab 63) can be secured. By loosening of the fastener 68, the measurement element 60 with post 67 can be slid along the length of the support slot 81. Accordingly, position of the measurement element 60 can be adjusted so as to adapt to vehicle wheels of different diameter.

The arrangement including the support post 67, support tab 63, and fastener 68 can also be used in an arrangement the same as or similar to the measurement device 10 shown in FIG. 1 and the measurement device 10 shown in FIG. 5, for example. With the arrangement shown in FIG. 1, the securement slot 44 can extend through the extension portion 43 of the arm 40. With such through-slot, the fastener 68 can extend through the support tab 63, through the support post 67, through the extension portion 43, through the support slot 81 (in the support element or platform 80) and be secured by a nut or threads located in or underneath the support platform 80. Adjustability can be provided by loosening the fastener 68 and thus loosening securement of the measurement element 60 on the support surface or platform 80. The measurement element 60 can then be moved to a desired position.

Accordingly, the measurement device 10 of the disclosure provides substantial interchangeability and adjustability so as to quickly and easily adapt to measure vehicle wheels of different size and geometry.

As described above, the particular hub and bearing mount 15 can be selected so as to correspond with a bolt pattern 72 of a particular vehicle wheel 70 to be measured.

With the arrangement of FIG. 1, a vehicle wheel 10, to be measured, can be attached onto the hub and bearing mount 15. More specifically, the studs 23 can be received and passed through bolt holes 71 in the vehicle wheel 70. The vehicle wheel 70 can thus be mounted onto the hub and bearing mount 15. The studs 23 can extend above the mounted vehicle wheel 70 so as to be accessible. Lug nuts can be screwed onto the studs 23 so as to secure the vehicle wheel 70 onto the hub and bearing mount 15. Other quick release fasteners or clamps can also be used in place of the lug nuts to secure the wheel in place. In some uses or implementations of the measurement device 10, it may be sufficient to slip the vehicle wheel 70 onto the studs 23 without securement using nuts or other attachment structure.

The measurement element 60 can include a measuring tip 61 that is configured to accommodate variation in height of the rim. More specifically, as shown in FIG. 6, the measuring tip 61 can include a vertical tip element 62. The vertical tip element 62 can accommodate variation in height of the rim 73. The vertical tip element 62 can be configured and used to ensure that accurate radial measurements can still be taken even if the rim flange moves inboard due to material constraints and/or deformation.

The measurement element 60 can display and output data in any manner as desired. For example, the measurement element 60 can output data in the form of a display that is provided on the measurement element 60 itself. The measurement element 60 can output a digital and/or analog output. The output can display or render an amount that the measuring tip is displaced, for example. The measurement element 60 can output data, relating to measurements to a computer or processor. The data can then be processed by the computer or processor. The output can be displayed on the computer or processor.

Figure 7:
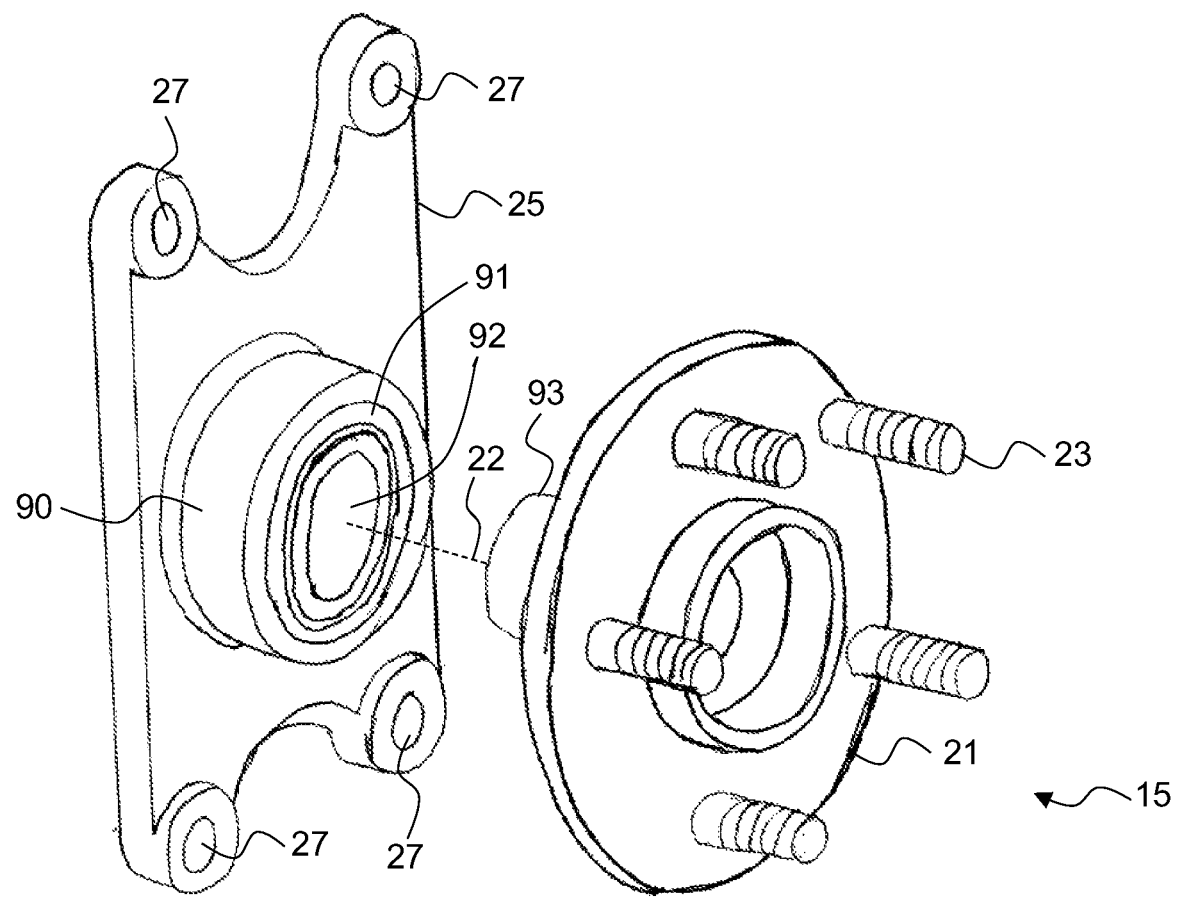
FIG. 7 is an exploded perspective view of a hub and bearing mount of the measurement device of FIG. 1.

Referring to FIG. 7, the base 25 can include a mounting collar 90. The mounting collar 90 can be a hollow cylinder that is centered on the axis 22. The hub and bearing mount 15 can include a bearing 91 connected to the mounting collar 90 in any appropriate manner such as but not limited to a press-fit. The bearing 91 can be any appropriate rolling element bearing such as but not limited to a ball bearing or a roller bearing having an inner race, an outer race and a single row or a double row of rolling elements. The outer race can be press-fit into the mounting collar 90. The bearing 91 can include an opening 92 that is centered on axis 22.

The hub 21 can include a hub collar 93 extending away from one side of the disc shaped portion of the hub 21, and five studs 23 extending from an opposite side of the disc shaped portion of the hub 21. The hub collar 93 can be a hollow cylinder that is centered on the axis 22. The hub collar 93 can extend into the opening 92 of the bearing 91. The hub collar 93 can be connected to the inner race of the bearing 90 in any appropriate manner such as but not limited to a press-fit.

The hub and bearing mount 15 can form a first wheel support module.

Figure 8:
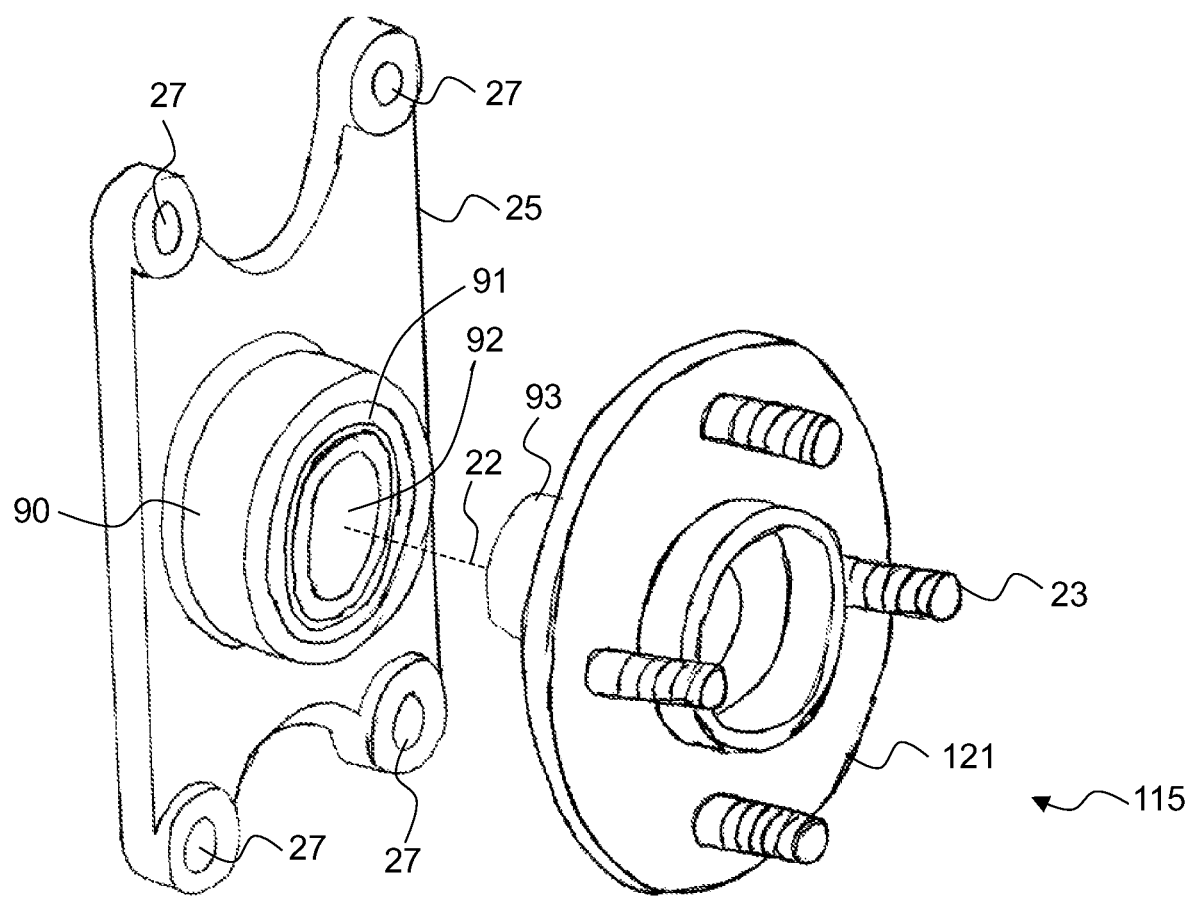
FIG. 8 is an exploded perspective view of an exemplary second hub and bearing mount for use in a kit made in accordance with principles of the disclosed subject matter.

Referring to FIG. 8, a second wheel support module can include a second hub and bearing mount 115. The main difference between the exemplary first wheel support module of FIG. 7 and the exemplary second wheel support module of FIG. 8 is the different number of studs 23. However, it should be understood that many other differences between the wheel support modules can exist, and that any number of additional wheel support modules can be provided in a kit. For example, a third wheel support module could include a hub 21 that includes three studs 23, or any other number of studs, or even a single attachment post or structure for connecting the vehicle wheel to the wheel support module. The hub 21 can also be shaped different in any of three dimensions, and can be non-symmetrical. In addition, the shape of the disc that forms the hub 21 can be non-circular and any of various shapes that would facilitate connection to a particular type of vehicle wheel.

The module adaptor 30 can also form part of the second wheel support module. However, the module adaptor 30 is not a necessary component of any of the wheel support modules. By including a plurality of different wheel support modules, the measurement device can be formed as a kit that can be used to connect to many differently shaped and sized vehicle wheels. This type of modular measuring system and method can be used to quickly and accurately measure various types of wheels for specification compliance, quality control, and possibly in the field for various deformations due to manufacturing issues and/or exposure to routine or non-routine forces applied to the wheel during driving or testing. Thus accuracy, repeatability, and speed of automotive wheel impact deformation measurement can be enhanced through the use of the disclosed subject matter.

Features, elements and/or characteristics described with respect to one embodiment of the disclosure may be variously used with other embodiments of the disclosure as may be desired.

Various components of embodiments of the disclosure can be made from any of a variety of materials including, for example, steel, metal, plastic, plastic resin, nylon, composite material, and/or rubber, for example, or any other material as may be desired.

A variety of production techniques can be used to make the structures described herein. For example, suitable casting and/or injection molding and other molding techniques, extrusion and other manufacturing techniques can be utilized. Also, metal stamping or cutting can be utilized.

It will be understood by those persons skilled in the art that the present disclosure is susceptible to broad utility and application. Many embodiments and adaptations of the present disclosure other than those herein described, as well as many variations, modifications and equivalent arrangements, will be apparent from or reasonably suggested by the present disclosure and foregoing description thereof, without departing from the substance or scope of the disclosure.

Accordingly, while the present disclosure has been described herein detail in relation to its exemplary embodiments, it is to be understood that this disclosure is only illustrative and exemplary and is made to provide an enabling disclosure. Accordingly, the foregoing is not intended to be construed or to limit the present disclosure or otherwise to exclude any other such embodiments, adaptations, variations, modifications and equivalent arrangements.

For example, in the arrangement shown in FIG. 1, slots 51, 52, 53 are provided on the attachment flange 50. Such slots provide for adjustment of the module adapter 30 up and down. However, the slots 51, 52, 53 can alternatively or additionally be provided in the second mount plate 33 of the module adapter 30. In such an arrangement, a threaded end of each of the fasteners 39 can be secured using a suitable fasteners, such as a nut, pin, weld, etc.

While the subject matter has been described in detail with reference to exemplary embodiments thereof, it will be apparent to one skilled in the art that various changes can be made, and equivalents employed, without departing from the scope of the invention.

What is claimed is:

1. A vehicle wheel deformation measurement device, comprising:
   a first wheel support module configured to attach to a vehicle wheel and to provide for rotation of the vehicle wheel about an axis;
   an arm removably attached to the first wheel support module;
   a measurement element moveably attached to the arm, the measurement element including a sensor structure configured to be positioned adjacent a lip of the vehicle wheel when attached to the first wheel support module to measure deformation of the vehicle wheel; and
   a second wheel support module configured to attach to a second vehicle wheel and to provide for rotation of the second vehicle wheel, the second wheel support module having a different configuration from the first wheel support module.

2. The measurement device of claim 1, wherein the first wheel support module includes a first hub with a first number of studs extending from the first hub, and the second wheel support module includes a second hub with a second number of studs extending from the second hub, wherein the first number of studs is different from the second number of studs.

3. The measurement device of claim 1, wherein the first wheel support module includes:
   a hub and bearing mount; and
   a module adaptor attached to the arm, wherein
   the hub and bearing mount is attached to the module adaptor.

4. The measurement device of claim 3, wherein the hub and bearing mount is removably attached, by at least one fastener, to the module adaptor so as to allow interchangeability of the hub and bearing mount.

5. The measurement device of claim 3, wherein the hub and bearing mount and the module adaptor are integrally formed, and
the first wheel support module is removably attached, by at least one fastener, to the arm so as to allow interchangeability of the wheel support module.

6. The measurement device of claim 3, wherein the arm includes
an attachment plate,
an attachment flange extending upwardly from the attachment plate, the attachment flange including at least one slot, and a respective fastener extending through the at least one slot and into the module adaptor, and
the at least one slot configured to provide for vertical adjustment of the hub and bearing mount relative to the arm and measurement element.

7. The measurement device of claim 3, wherein the hub and bearing mount include a disc and plurality of studs that extend upwardly from the disc, and a base that rotatably supports the disc.

8. The measurement device of claim 1, wherein the arm includes a securement slot, and the measurement element is movable attached to the securement slot so that the measurement element is radially adjustable relative to the axis.

9. The measurement device of claim 1, wherein the first wheel mount module includes a module adaptor configured to connect to the arm such that the first wheel mount module is movable in a first direction relative to the measurement element, and
the arm includes attachment structure configured to permit the measurement element to move in a second direction orthogonal to the first direction.

10. The measurement device of claim 1, wherein the measurement element includes a dial gauge that includes a tip portion, and the tip portion is configured to be positioned adjacent the lip of the vehicle wheel while the vehicle wheel is rotated.

11. A vehicle wheel deformation measurement device comprising:
a first wheel mount module including attachment structure configured to removably attach to a vehicle wheel;
a positioning bracket removably attached to the first wheel mount module;
a measurement element attached to the positioning bracket, wherein the positioning bracket is configured to position the measurement element adjacent the vehicle wheel when the vehicle wheel is attached to the first wheel mount module in order to measure deformation of the vehicle wheel when the vehicle wheel is rotated; and
a second wheel support module configured to attach to a second vehicle wheel and to provide for rotation of the second vehicle wheel, the second wheel support module having a different configuration from the first wheel support module.

12. The measurement device of claim 11, wherein the first wheel mount module includes a hub and a base, and the hub is rotatably attached to the base by a bearing.

13. The measurement device of claim 11, wherein the first wheel mount module includes a module adaptor configured to connect to the positioning bracket such that the first wheel mount module is movable in a first direction relative to the measurement element, and
the positioning bracket is configured to permit the measurement element to move in a second direction orthogonal to the first direction.

14. The measurement device of claim 11, wherein the first wheel support module includes a first hub with a first number of studs extending from the first hub, and the second wheel support module includes a second hub with a second number of studs extending from the second hub, wherein the first number of studs is different from the second number of studs.

15. A wheel deformation measurement kit, comprising:
a first wheel support module configured to attach to a first vehicle wheel and to provide for rotation of the first vehicle wheel about an axis;
a second wheel support module configured to attach to a second vehicle wheel and to provide for rotation of the second vehicle wheel, the second wheel support module having a different configuration from the first wheel support module;
a measurement element configured to measure deformation of at least one of the first vehicle wheel and the second vehicle wheel;
a positioning bracket including a wheel support module attachment structure at a first portion and a measurement element attachment structure at a second portion, such that the first wheel support module and the second wheel support module are removably attachable to the wheel support module attachment structure.

16. The measurement kit of claim 15, wherein the first wheel support module includes a hub and bearing mount.

17. The measurement device of claim 15, wherein the first wheel support module includes a first hub with a first number of studs extending from the first hub, and the second wheel support module includes a second hub with a second number of studs extending from the second hub, wherein the first number of studs is different from the second number of studs.

18. The measurement kit of claim 15, further comprising:
a module adaptor configured to connect to the positioning bracket such that a respective one of the first wheel mount module and second wheel mount module are movable in a first direction relative to the measurement element when the respective one of the first wheel mount module and second wheel mount module is connected to the module adaptor, wherein
the measurement element attachment structure of the positioning bracket is configured such that the measurement element is movable in a second direction orthogonal to the first direction when the measurement element is movably connected to the attachment structure.

* * * * *